United States Patent [19]

Godbersen

[11] 4,329,108

[45] May 11, 1982

[54] ADJUSTABLE LENGTH BOAT TRAILER

[76] Inventor: Byron L. Godbersen, R.R., Ida Grove, Iowa 51445

[21] Appl. No.: 48,976

[22] Filed: Jun. 15, 1979

[51] Int. Cl.$^3$ .................................................. B60P 3/10
[52] U.S. Cl. ..................................... 414/534; 280/482;
280/656; 280/414.1
[58] Field of Search ............................ 414/532–534,
414/529, 435; 280/414 R, 656, 482; 9/1.2

[56] References Cited

U.S. PATENT DOCUMENTS

| | | | |
|---|---|---|---|
| 2,529,849 | 11/1950 | Oeth | 9/1.2 X |
| 2,937,775 | 5/1960 | Funk, Jr. | 414/534 X |
| 3,044,646 | 7/1962 | Sperow | 414/534 X |
| 3,154,324 | 10/1964 | Symes | 280/414 R |
| 3,917,087 | 11/1975 | Godbersen | 280/414 R X |
| 4,011,958 | 3/1977 | Carrick | 414/529 |

FOREIGN PATENT DOCUMENTS 519992 3/1955 Italy ................................ 280/414 R Primary Examiner—Charles A. Marmor
Attorney, Agent, or Firm—Henderson & Sturm

[57] ABSTRACT

An adjustable length boat trailer has a rigid framework mounted on an axle supported by wheels. The framework has a rearward U-shaped portion and a pair of converging arm sections at its forward end. A T-shaped elongated tongue member is slideably and releasably secured to the framework. The tongue member has a forward elongated shaft portion having a hitch connection and rearward outwardly disposed crosspiece arms. The shaft portion is slideably and releasably secured between the converging arm sections while the crosspiece arms are adjustably and releasably secured to the U-shaped portion of the framework. Each of the crosspiece arms pivotally supports a roller assembly which is moveable along the length of the arm.

4 Claims, 4 Drawing Figures

ADJUSTABLE LENGTH BOAT TRAILER

BACKGROUND OF THE INVENTION

When a person purchases a boat, the most important subsequent purchase which they will make besides the motor is a boat trailer with which to transport the boat and motor to and from a navigable body of water.

Most of the boat trailers on the market today are manufactured to accommodate a specific length craft and cannot be adjusted to support larger or smaller boats. When a person decides to buy a larger craft it is almost always necessary to purchase a new trailer which is not an inexpensive item.

Boat dealers are also faced with the problem of maintaining a large inventory of trailers to accommodate the various length craft which they handle.

Most of the prior art solutions to this problem have employed a telescoping trailer bed frame of one form or the other. Some of the problems associated with this type of device have been; the cost of manufacturing due to the tolerances involved, limited length increases available to the user, binding of the telescoping elements due to rust or corrosion, separation of the telescoping elements during transport resulting in extensive damage to the boat, and improper placement of the supporting trailer carriage under the forward portions of the bow which results in unnecessary stress being exerted on the hull during the time that the boat is not in use, which can result in the structural failure of the hull in extreme instances.

SUMMARY OF THE INVENTION

An object of the present invention is the provision of a boat trailer which can accommodate craft which may vary in lengths of up to five feet.

Another object is to provide a boat trailer wherein a stationary trailer bed has a moveable support carriage which allows a single trailer bed frame to accommodate various length boats.

A further object of this invention is the provision of an adjustable boat trailer wherein the forward support carriage is always positioned at the proper location for different length craft.

Still another object is to provide a trailer which will allow dealers to drastically reduce their inventory stock due to its versatility.

A still further object is the provision of a simple, rugged trailer construction which is simple to adjust and virtually inseparable when assembled.

These and other objects, advantages, and novel features of the present invention will become apparent from the following detailed description of the invention when considered in conjunction with the accompanying drawings.

DESCRIPTION OF THE PREFERRED EMBODIMENT

Figure 1:
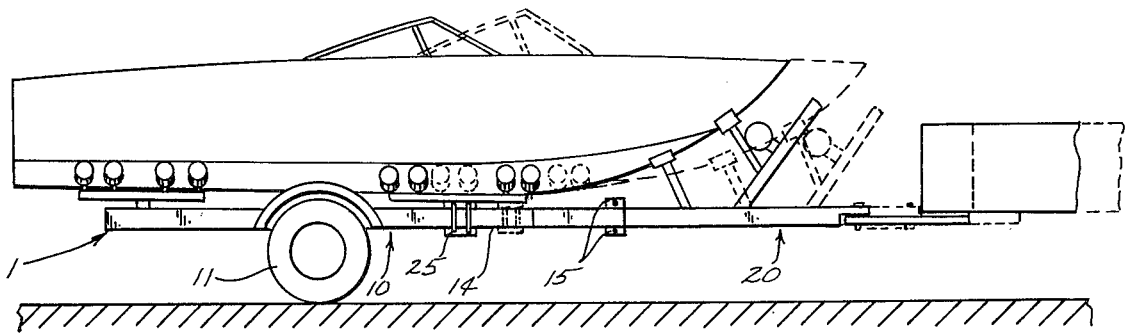
FIG. 1 is a side elevational view of the adjustable trailer of the instant invention.
Figure 2:
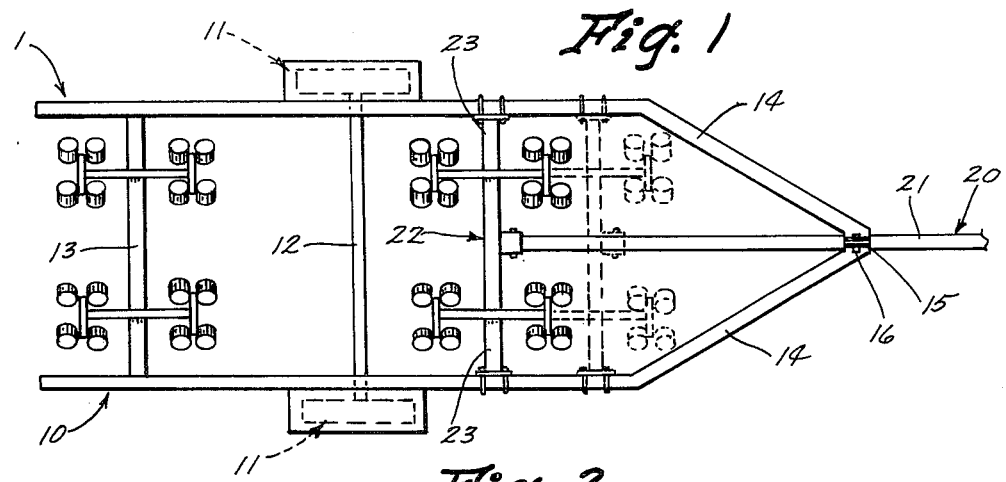
FIG. 2 is a top plan view of the trailer bed frame and extensible trailer tongue in their retracted and extended positions.

FIG. 1, illustrates a preferred embodiment of the adjustable boat trailer designated generally as 1. The trailer comprises a rigid frame or bed 10 mounted on wheels 11 via connection of the frame to an axle member 12. The frame member 10 comprises a generally U-shaped rearward portion 13, with each of the arms of the U having converging arm portions 14 extending forward on the frame.

Each of the converging arms have a flanged collar portion 15 at their free ends which are adapted to be joined together by suitable securing means 16.

The trailer 10 further comprises a T-shaped extensible tongue member designated generally as 20. The tongue member 20 comprises an elongated tongue or drawbar shaft 21 having a standard hitch connection on its forward end and a crosspiece member 22 on its rearward end.

Figure 3:
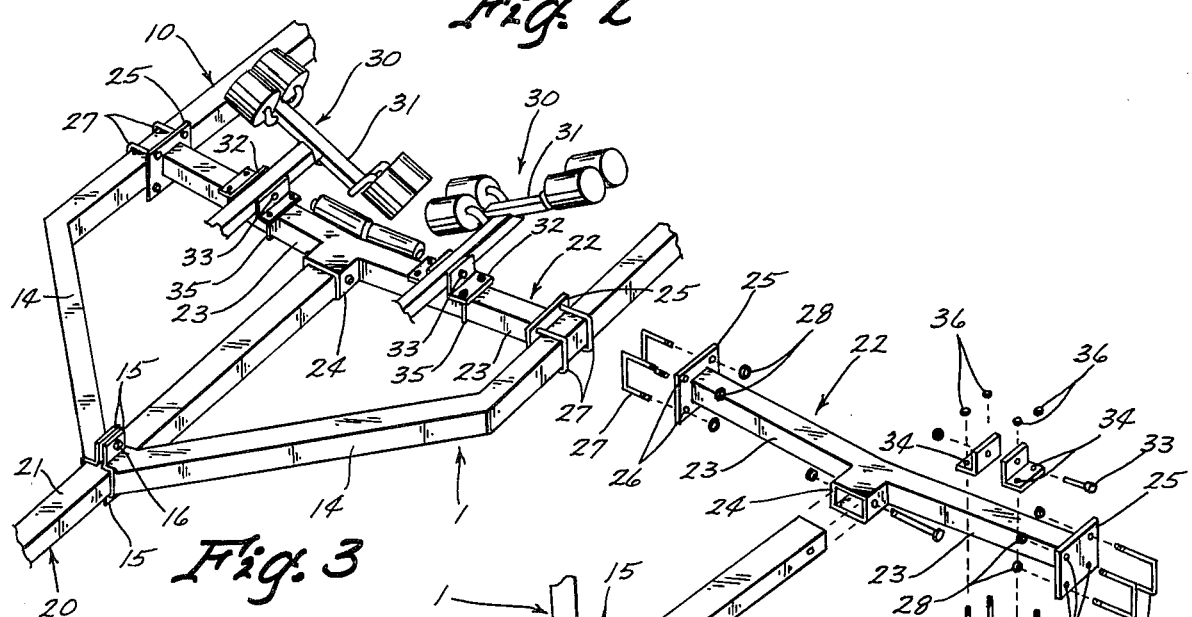
FIG. 3 is a perspective view of the connections between the trailer bed frame and the extensible trailer tongue.
Figure 4:
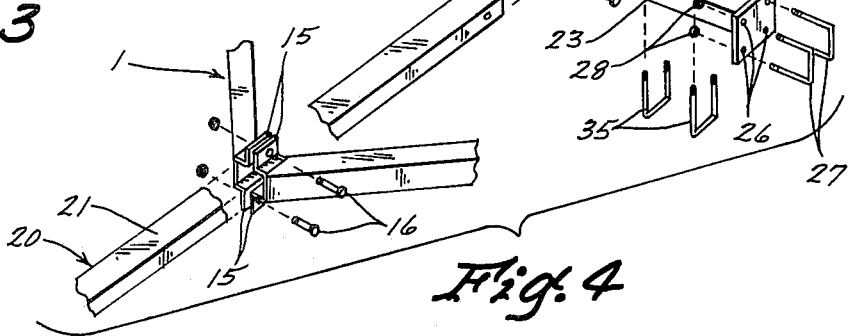
FIG. 4 is an exploded perspective of the trailer bed and tongue and their cooperating elements.

The crosspiece member 22 comprises a pair of crosspiece arms (as shown in FIGS. 3 and 4) 23 and a centrally disposed shaft receiving member 24. The crosspiece member 22 further comprises flanged shoulders 25 at the ends of the crosspiece arms 23, and the elongated shaft 21 is secured to the crosspiece shaft receiving member by any suitable means such as welding, bolts, etc.

The extensible tongue member 20 is connected to the frame 10 in the following manner. The crosspiece 22 is dimensioned to fit within the U-shaped portion of the trailer frame 10 with the flanged shoulders 25 contacting the sides of the frame. Suitable apertures 26 are disposed in the flanged shoulders to receive u-shaped threaded connecting rods which secure the crosspiece to the frame when locking nuts 28 are threaded thereon. The elongated shaft portion 21 of the extensible tongue 20 is slideably received between the flanged collar portion 15 of the converging frame arms 14, and frictionally secured thereto by the locking means 16.

Mounted on each crosspiece arm 23 is a carriage support member designated generally as 30, comprising a roller assembly 31 pivotally connected to a pair of angle brackets 32 via a pivot member 33. Each angle bracket 32 has a pair of apertures 34 disposed therein to receive a u-shaped threaded connection rod 35 which secures the carriage assembly 32 to the crosspiece arm 23 when a pair of locking nuts 36 are threaded thereon.

It should be appreciated by now that this ingenious construction allows both lateral and axial movement of the forward carriage support assembly 30 within the stationary trailer framework to accommodate craft of various length, hull design and width and insures that the boat is properly supported by the carriage assembly at all times.

In the preferred embodiment shown, the axial movement of the carriage assembly is limited in the forward direction by the converging arms of the frame and in the rearward direction by the wheel assembly connection to the frame. The roller carriage assembly may be secured at any desired location between those two points.

The large frictional surface area at the points where the frame and extensible tongue are joined together, insure that when the locking nuts are tightened, it will be virtually impossible for the carriage assembly to shift within the trailer framework.

The adjustable aspect of this trailer construction enables five different trailer frames to handle boats ranging in size from 15 to 26 feet in length, with the larger trailers accommodating boats which vary in length by as much as 5 feet.

While the preferred embodiment utilizes connecting rods to secure the crosspiece member within the trailer framework, this is for illustration purposes only, and it should be obvious that other securing means could be employed which would extend the axial adjustability of the carriage assembly.

Having thereby disclosed the subject matter of this invention it should be obvious that many modifications, substitutions and variations of the invention are possible in light of the above teachings.

It is therefore to be understood, that the invention may be practiced other than as specifically described and should be limited only by the breadth and scope of the appended claims.

What I claim is:

1. A boat trailer comprising:

frame means including a pair of integral side frame members each having a straight portion and an angled portion, said frame members disposed such that said straight portions are parallel and said angled portions converge toward each other, the forward ends of said angled portions spaced from each other, a stationary brace extended across and interconnecting the rear ends of said straight portions;

wheel means connected to said straight portions of said frame means;

tongue means including a movable brace disposed parallel to said stationary brace the ends of which are releasably clamped to said straight portions, said tongue means including further an elongated tongue member secured at its rear end to the center of said movable brace and extended forwardly between said angled portions spaced ends;

means releasably clamping said spaced ends to said tongue member; and boat supporting means including a plurality of units one or more of which is mounted on said stationary and movable braces.

2. An adjustable length boat trailer as in claim 1, wherein each of said units of said boat supporting means comprises a roller assembly.

3. An adjustable length boat trailer as in claim 2 wherein said movable brace is comprised of a pair of crosspiece arms which extend in opposite directions from the center of said movable brace, the ends of said crosspiece arms being releasably clamped to said straight portions of said frame means, one of said roller assemblies being releasably and adjustably secured upon each of said crosspiece arms.

4. An adjustable length boat trailer as in claim 3, wherein said roller assemblies are pivotally mounted upon said crosspiece arms.

* * * * *